March 8, 1955     A. Y. DODGE     2,703,637
BOOSTER MASTER CYLINDER FOR VEHICLE BRAKING SYSTEM
Filed Aug. 9, 1952
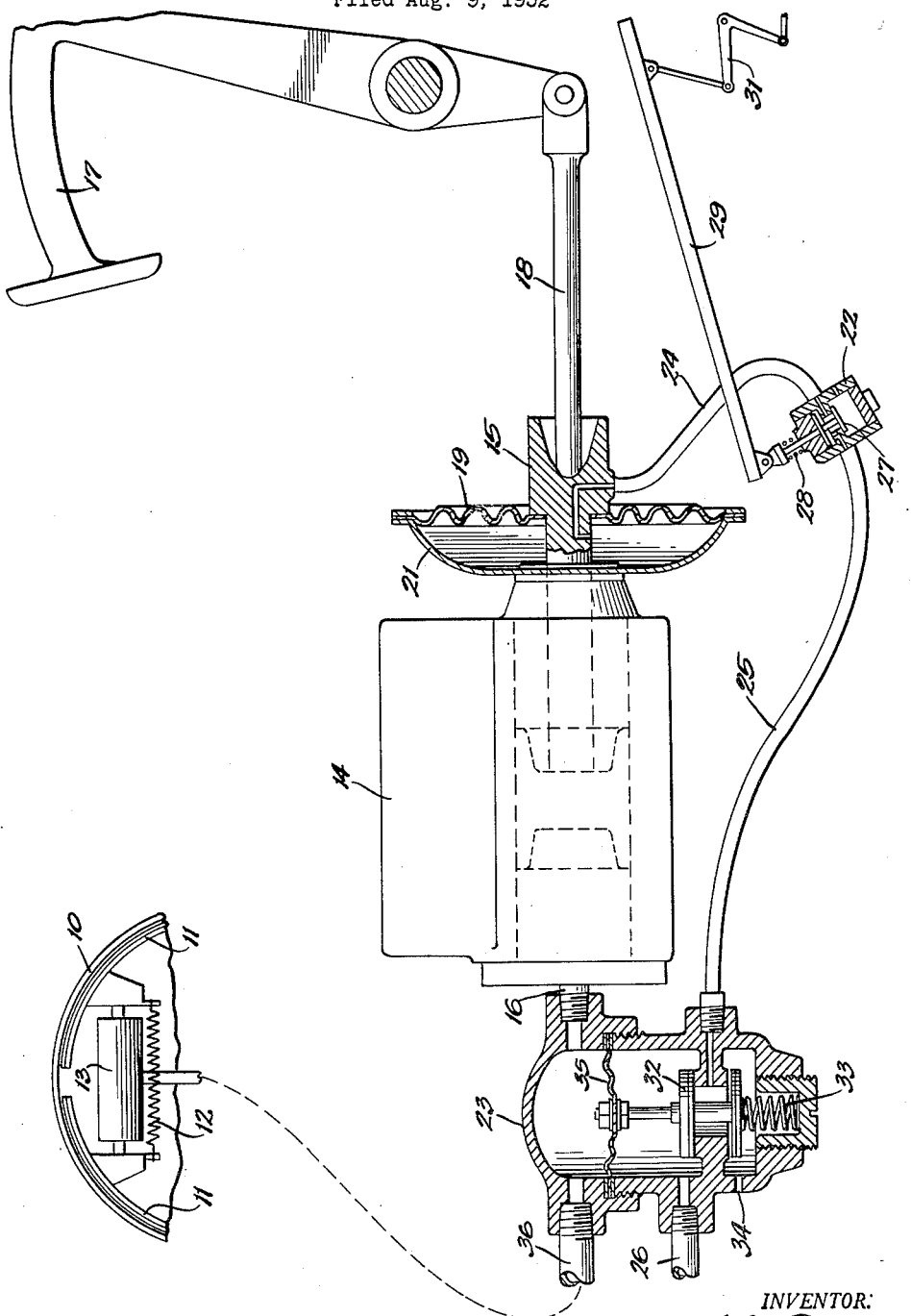
INVENTOR:
Adiel Y. Dodge,
BY
Bair, Freeman & Molinare
ATTORNEYS.

United States Patent Office 2,703,637
Patented Mar. 8, 1955

2,703,637

BOOSTER MASTER CYLINDER FOR VEHICLE BRAKING SYSTEM

Adiel Y. Dodge, Rockford, Ill.

Application August 9, 1952, Serial No. 303,469

15 Claims. (Cl. 192—3)

This invention relates to a booster master cylinder for vehicle braking system, and more particularly to a manually controlled power assisted applying mechanism for vehicle brakes.

Power assisted operating mechanism for vehicle brakes have heretofore been proposed in which the initial movement of the brake pedal energizes a power device which assists manual effort applied to the pedal in applying the brakes. One difficulty with such devices is that there is always a brief time interval required for the power device to come into effect, and in rapid applications of the brakes they are frequently fully applied manually before the power device becomes effective. This means that in emergency applications when the power is most needed, it is not available.

It is accordingly one of the objects of the invention to provide a booster master cylinder in which the power device is initially energized before the brake pedal is operated so that power is immediately available for rapid applications.

Another object is to provide a booster master cylinder in which the power device is controlled separately from the brake pedal, as, for example, by the conventional accelerator pedal to become effective upon removal of the operator's foot from the accelerator pedal and before the brake pedal is depressed.

It has also been proposed heretofore to use a compound master cylinder to take up brake clearance rapidly and to provide high applying pressure after the brake shoes are in engagement with the drum. One objection to such devices is that they have an initial heavy feel which makes the operation unpleasant due to the high initial force required on the pedal.

It is another object of the present invention to provide a compound booster master cylinder in which the power device furnishes just enough force to overcome the initial heavy feel, leaving the brake application almost solely under the manual pedal control.

According to one feature of the invention the power device may furnish sufficient force for a very light brake application such as to hold the vehicle on a mild grade.

A further object is to provide a booster master cylinder in which the amount of force exerted by the power device is controlled in response to the brake applying pressure developed by the master cylinder.

With this construction the power assisting force is constant regardless of fluctuation in the degree of vacuum available so that the brake operates uniformly under all conditions.

The above and other objects and features of the invention will be more readily apparent from the following description when read in connection with the accompanying drawing, in which The single figure is a diagrammatic view with parts in section of a booster master cylinder embodying the invention.

As shown, the master cylinder of the invention is adapted to be applied to a vehicle braking system in which the wheels of the vehicle carry brake drums 10 engaged by friction shoes 11 to provide a braking force. The shoes 11 are normally retracted from the drum by springs 12 and are forced into braking engagement with the drum by wheel cylinders 13 connected to the shoes to expand them radially.

The wheel cylinders 13 are supplied with hydraulic liquid under pressure from a master cylinder 14, which is preferably a compound master cylinder and which may be of the type more particularly described and claimed in my Patent No. 2,507,663. Since the construction of the master cylinder is fully disclosed in the patent, it is not illustrated in detail herein. However, the cylinder includes a movable plunger 15 connected to a piston in the cylinder and which is moved inwardly of the cylinder to develop braking pressures. Upon initial movement of the plunger into the cylinder, a relatively high volume of liquid at low pressure will be forced out the outlet pipe 16 of the cylinder. As the back pressure from the brake cylinders 13 builds up, operation of the compound master cylinder changes so that upon continued movement of the plunger 15 into the cylinder a relatively small volume of liquid at high pressure is pumped out the outlet pipe 16 to supply a high applying pressure to the wheel cylinders. In this way, clearance in the brakes is taken up rapidly with a relatively small movement of the plunger and thereafter the desired high applying pressure is furnished to the wheel cylinders to apply the brakes.

Movement of the plunger is controlled by a foot pedal 17 of conventional construction connected to the plunger 15 through a push rod 18 to force the plunger into the master cylinder when the foot pedal is depressed. Additionally, according to the present invention, the plunger 15 is connected to a flexible closure 19 of a vacuum motor 21 so that when the motor is connected to vacuum the flexible closure 19 will exert an inward force on the plunger 15.

The motor 19 is adapted to be connected to a source of vacuum, such as the intake manifold of the vehicle engine, through a shut off valve 22 and a regulating valve 23. The shut off valve is shown as a poppet type valve connected through a hose 24 to the vacuum motor and through a second hose 25 to the regulating valve. The regulating valve is connected through a hose 26 to the engine intake manifold. The shut off valve contains a spool 27 normally urged upward to the position shown by a spring 28. In this position the hoses 24 and 25 are connected to connect the vacuum motor through the regulating valve to the source of vacuum.

The shut off valve is controlled independently of the brake pedal 17. As shown, the upper end of the spool 27 is pivotally connected to the rear or lower end of a conventional accelerator pedal 29, which is adapted to be swung about its pivot to control the engine throttle in the usual manner through the linkage 31. When the operator's foot is on the accelerator pedal, the spool 27 will be shifted downward against the relatively light spring 28 to close off the pipe 25 and to vent the pipe 24 to atmosphere. At this time the motor 21 is disconnected from the source of vacuum and is vented to atmosphere so that it exerts no pressure on the plunger 15. Pivotal movement of the pedal 29 about its connection to the spool 27 constitutes its normal controlling movement to control the engine throttle and shifting of the rear end of the pedal 29 against or in response to the spring 28 constitutes an additional movement not interfering with the normal movement.

The regulating valve 23 is adapted to control the motor so that it will exert a constant force on the plunger to develop a constant predetermined pressure in the wheel cylinders regardless of fluctuations in the vacuum at the source or variation in pedal pressure. For this purpose the regulating valve contains a valve spool 32 normally urged upward by a spring 33 to a position in which it connects the pipes 25 and 26. When the spool 32 is moved downward to the position shown it interrupts communication between pipes 25 and 26 and connects pipe 25 to atmosphere through a vent opening 34. The spool is urged downward by a flexible diaphragm 35 open at its top to the upper end of the regulating valve housing. The outlet pipe 16 of the master cylinder communicates with the space above the diaphragm 35, as do one or more pipes 36 leading to the wheel cylinders 13.

With this construction when the pressure above the diaphragm 35 is sufficient to over-force the spring 33 and move the valve spool downward, communication between the source of vacuum and the motor 21 will be interrupted. When the pressure above the diaphragm is less than sufficient to balance the spring, the motor 21 will be connected to the source of vacuum to be energized. Therefore the regulating valve functions to supply a degree of vacuum to the motor 21 which is just sufficient to develop a regulated brake operating pressure determined by the adjustment of the spring 33.

The spring 33 is preferably adjusted to produce an operating pressure just sufficient to take up the brake clearance and to press the shoes 11 very lightly against the drum 10. This pressure may be on the order of that required to overcome the return spring 12 and to produce a brake drag sufficient to cause a deceleration of 2 ft. per second per second or less. A brake drag of this type would be sufficient to hold the vehicle against rolling on a light grade but would produce no objectionable interference with brake control in the moving vehicle during deceleration. If the vehicle is moving and a brake application becomes desirable, the operator would first remove his foot from the accelerator pedal 29 and transfer it to the brake pedal 17 to apply the brakes. As soon as the pressure is removed from the accelerator pedal 29, the valve 22 will open to connect the vacuum motor 21 to the source of vacuum.

In the very brief interval required to transfer the operator's foot from the accelerator pedal to the brake pedal, the vacuum motor will be energized and will exert sufficient pressure on the master cylinder to take up the brake clearance and apply the brake shoes lightly against the brake drum. Therefore when the operator presses his foot upon the brake pedal 17, the initial heavy feel incident to compound master cylinder operation is removed, and upon initial movement of the brake pedal a high brake applying pressure will be developed to apply the brakes. It will be noted that the brake application is essentially under the sole control of the manual pedal which through the compound master cylinder can effect a very high applying pressure with a pleasant feel and with an accurately controlled applying force. Therefore the brakes are not only applied rapidly with full effectiveness but a pleasant pedal feel is produced utilizing to the full the advantages of a compound master cylinder without the unpleasant feel normally associated therewith.

Even in installations wherein a compound master cylinder is not employed, the invention provides a number of advantages including an immediate reduction in the required pedal pressure and the ability to hold the vehicle on mild grades without the necessity of maintaining the operator's foot on the brake pedal.

When it is desired to coast with no brake drag the operator may let the weight of his heel stay on the accelerator pedal to hold the valve 22 closed while allowing the toe end of the pedal to rise to close the engine throttle. In this way the vehicle can be allowed to coast in the usual manner with no brake drag.

While one embodiment of the invention has been shown and described in detail, it will be understood that this is illustrative only and is not to be taken as a definition of the scope of the invention, reference being had for this purpose to the appended claims.

What is claimed is:

1. In a vehicle braking system including a brake, applying means to apply the brake, operating means connected to the applying means to transmit actuating force thereto, and a pedal connected to the operating means to operate it, booster mechanism comprising a motor connected to the operating means, a regulating device to control the motor, means responsive to the actuating force transmitted to the applying means by the operating means to control the regulating device so that the motor causes the applying means to take up clearance in the brake and apply it lightly, and a control device for the motor to make it effective or ineffective.

2. In a vehicle braking system including a brake, applying means to apply the brake, operating means connected to the applying means to transmit actuating force thereto, and a pedal connected to the operating means to operate it, booster mechanism comprising a motor connected to the operating means, a regulating device to control the motor, means responsive to the actuating force transmitted to the applying means by the operating means to control the regulating device so that the motor causes the applying means to take up clearance in the brake and apply it lightly, a control pedal separate from the first named pedal, and a control device for the motor operated by the control pedal.

3. In a vehicle braking system including a brake, applying means to apply the brake, operating means connected to the applying means to transmit actuating force thereto, and a pedal connected to the operating means to operate it, booster mechanism comprising a motor connected to the operating means, a regulating device to control the motor, means responsive to the actuating force transmitted to the applying means by the operating means to control the regulating device so that the motor causes the applying means to take up clearance in the brake and apply it lightly, a pivoted control pedal, a movable mounting for the control pedal urged in one direction by a spring and normally urged in the other direction by an operator, and a control device for the motor operated by the movable mounting.

4. In a vehicle braking system including a brake, a wheel cylinder connected to the brake to apply it, a master cylinder connected to the wheel cylinder to supply actuating pressure thereto, and a pedal connected to the master cylinder to operate it, booster mechanism comprising a motor connected to the master cylinder to operate it, a regulating device connected to the motor to regulate the force exerted thereby, means responsive to the actuating pressure developed by the master cylinder to control the regulating device, and a control device connected to the motor to make it effective or ineffective.

5. The construction of claim 4 in which the master cylinder is a compound cylinder and the motor under control of the regulating device exerts sufficient force thereon to take up the brake clearance and to produce a light brake application.

6. The construction of claim 4 including a control pedal having a normal controlling movement and an additional movement and the control device is operated by the additional movement of the control pedal.

7. In a vehicle braking system including a brake, a wheel cylinder connected to the brake to apply it, a master cylinder connected to the wheel cylinder to supply actuating pressure thereto, and a pedal connected to the master cylinder to operate it, booster mechanism comprising a vacuum motor connected to the master cylinder to operate it and having a vacuum connection, a regulating valve in the vacuum connection, means responsive to the actuating pressure developed by the master cylinder to control the regulating valve, and a shut off valve in the vacuum connection.

8. In a vehicle braking system including a brake, a wheel cylinder connected to the brake to apply it, a master cylinder connected to the wheel cylinder to supply actuating pressure thereto, and a pedal connected to the master cylinder to operate it, booster mechanism comprising a vacuum motor connected to the master cylinder to operate it and having a vacuum connection, a regulating valve in the vacuum connection, means responsive to the actuating pressure developed by the master cylinder to control the regulating valve, a shut off valve in the vacuum connection, a control pedal having a normal control movement and an additional movement, and a connection between the shut off valve and the control pedal to operate the shut off valve in response to said additional movement of the control pedal.

9. In a vehicle braking system including a brake, a wheel cylinder connected to the brake to apply it, a master cylinder connected to the wheel cylinder to supply actuating pressure thereto, and a pedal connected to the master cylinder to operate it, booster mechanism comprising a vacuum motor connected to the master cylinder to operate it and having a vacuum connection, a regulating valve in the vacuum connection, means responsive to the actuating pressure developed by the master cylinder to control the regulating valve, a pivoted control pedal to effect a normal control operation in response to pivotal movement, a support for the control pedal pivot movable at right angles to the pivotal axis, a spring urging the support in one direction, the support being moved in the other direction by the operator's foot on the control pedal, and a shut off valve in the vacuum connection connected to the support to be opened when the support is moved in said one direction and closed when the support is moved in said other direction.

10. The construction of claim 7 in which the master cylinder is a compound cylinder and the motor as controlled by the regulating valve exerts just enough force thereon to take up brake clearance and to apply the brake lightly.

11. In a vehicle braking system, a master cylinder, a pedal connected to the master cylinder to operate it, a fluid motor connected to the master cylinder to operate it and having an actuating fluid connection, a regulating valve in the fluid connection responsive to the master cylinder output pressure, and a shut off valve in the fluid connection.

12. The construction of claim 11 in which the master cylinder is a compound cylinder.

13. In a braking system for a vehicle having an engine with a throttle and a pivoted accelerator pedal to control the throttle, a brake, applying means to apply the brake, operating means to supply actuating force to the applying means, a brake pedal connected to the operating means to operate it, a booster motor connected to the operating means to exert an operating force thereon, control means for the booster motor including a movable part on which the accelerator pedal is pivoted and which is shifted in one direction by the weight of the operator's foot on the accelerator pedal to de-energize the booster motor, and a spring urging said part in the other direction to energize the booster motor when the accelerator pedal is released.

14. A braking system for a vehicle having an engine with a throttle comprising a brake, a master cylinder connected to the brake to supply applying pressure thereto, a brake pedal connected to the master cylinder to operate it, a booster vacuum motor connected to the master cylinder to exert a brake applying pressure thereon, a control valve to connect the motor to a source of vacuum and including a shiftable part, an accelerator pedal pivoted at one end on said part so that the weight of the operator's foot on the pedal will shift the part to a valve shut off position, linkage connecting the other end of the pedal to the engine throttle, and a spring urging said part in a direction to open the valve.

15. A braking system for a vehicle having an engine with a throttle comprising a brake, a master cylinder connected to the brake to supply applying pressure thereto, a brake pedal connected to the master cylinder to operate it, a booster vacuum motor connected to the master cylinder to exert a brake applying pressure thereon, a control valve to connect the motor to a source of vacuum and including a shiftable part, an accelerator pedal pivoted at one end on said part so that the weight of the operator's foot on the pedal will shift the part to a valve shut off position, linkage connecting the other end of the pedal to the engine throttle, a spring urging said part in a direction to open the valve, and a regulating valve in the connection from the motor to the vacuum source responsive to the brake applying pressure produced by the master cylinder to regulate the degree of vacuum in the motor.

References Cited in the file of this patent
UNITED STATES PATENTS

| | | |
|---|---|---|
| 2,087,819 | Sheneman | July 20, 1937 |
| 2,142,631 | Coyle | Jan. 3, 1939 |
| 2,316,396 | Breese | Apr. 13, 1943 |
| 2,626,026 | Sherwood | Jan. 20, 1953 |